United States Patent [19]

Rosenwinkel et al.

[11] Patent Number: 4,600,393
[45] Date of Patent: Jul. 15, 1986

[54] PORTABLE SELF-CONTAINED LIGHT BOX DRAWING TOY

[75] Inventors: Donald A. Rosenwinkel, Oak Park; Harry Disko, South Barrington, both of Ill.

[73] Assignee: Marvin Glass & Associates, Chicago, Ill.

[21] Appl. No.: 690,582

[22] Filed: Jan. 11, 1985

[51] Int. Cl.⁴ .............................................. G09B 11/06
[52] U.S. Cl. ...................................................... 434/88
[58] Field of Search ................... 282/3 A, 21 R, 21 B; 434/88, 155, 85; 281/6

[56] References Cited

U.S. PATENT DOCUMENTS

| | | | |
|---|---|---|---|
| 193,099 | 7/1877 | Shepherd | 434/416 X |
| 424,930 | 4/1890 | Loree | 282/3 A |
| 1,898,193 | 2/1933 | Lennstrom | 281/6 |
| 2,427,612 | 9/1947 | Lobb | 434/88 |
| 3,484,952 | 12/1969 | Coldren | 434/88 |
| 4,340,372 | 7/1982 | Brassine | 434/88 |
| 4,427,387 | 1/1984 | Tomita | 434/88 |

Primary Examiner—Harland S. Skogquist
Attorney, Agent, or Firm—John S. Pacocha

[57] ABSTRACT

A drawing toy including a housing supporting a roll of paper for rotational extraction and a battery powered light source. The paper passes over a light transmitting platen disposed above the light source and a selectively insertable transparency bearing a graphic design. An opening in the housing provides access to the portion of the paper passing over the transparency, platen and light source to permit repetitive tracing of the graphic design. Storage for additional transparencies and drawing materials is also provided in the housing.

7 Claims, 6 Drawing Figures

U.S. Patent    Jul. 15, 1986    4,600,393
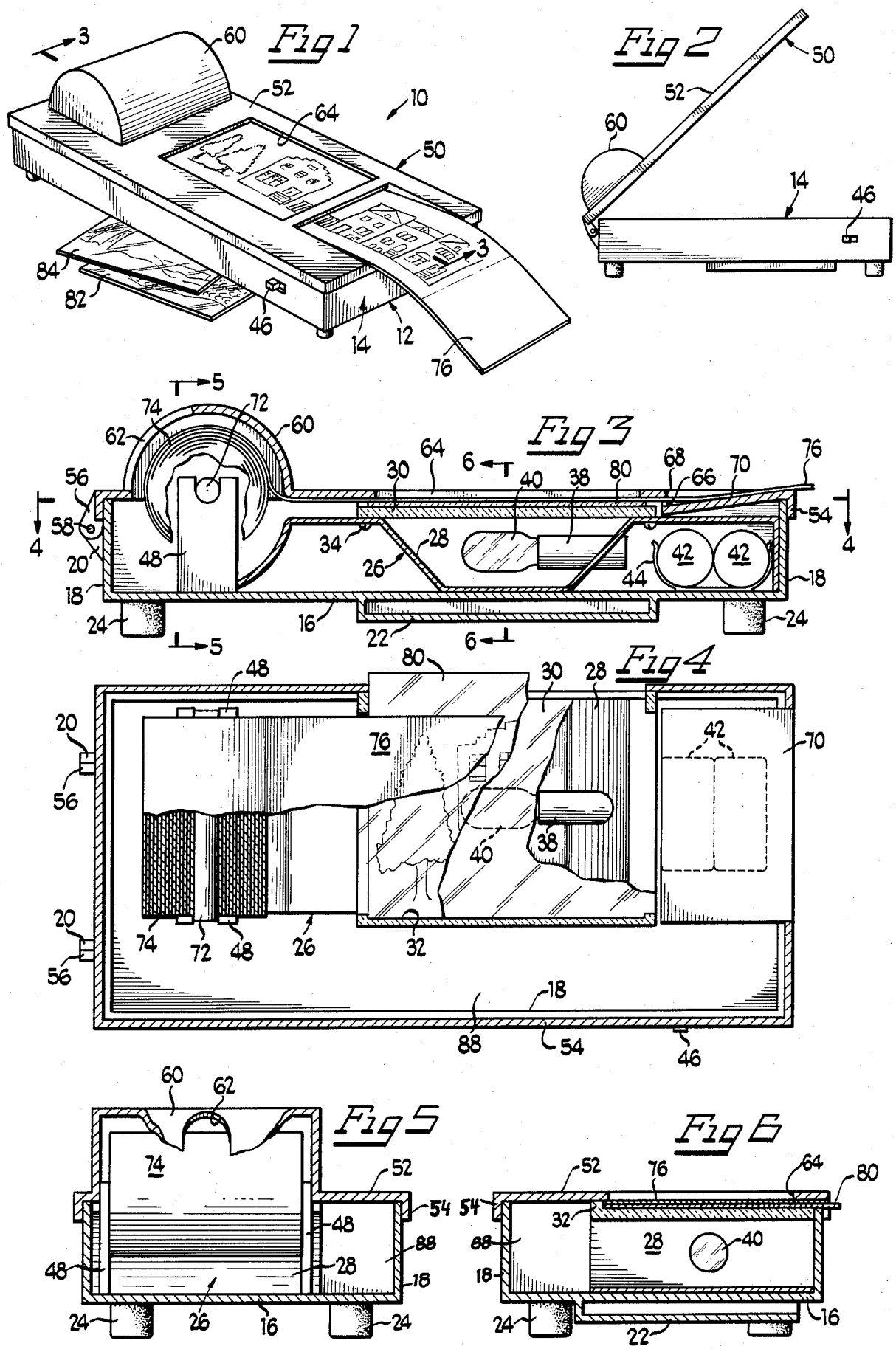

PORTABLE SELF-CONTAINED LIGHT BOX DRAWING TOY

BACKGROUND OF THE INVENTION

1. Field of the Invention

This invention relates generally to drawing toys for children and more particularly to a portable, self-contained light box drawing toy.

2. Background Art

Toys facilitating the creation of artwork by children are popular playthings that help develop childrens' talents and interests in art. Tracing over patterns aided by an underlying light has been used by adults as well as children to create drawings. Examples of such prior art devices are disclosed in U.S. Pat. Nos. 1,559,665 and 4,209,237. There remains, however, a need for additional drawing toys and particularly for a portable self-contained light box drawing toy that facilitates the creation of long repetitive designs.

SUMMARY OF THE INVENTION

The present invention is concerned with providing a portable, self-contained light box drawing toy that facilitates a child's creation of long repetitive designs. These and other objects and advantages of the present invention are achieved by providing a housing supporting a roll of paper for rotational extraction and a battery powered light source. As the paper is extracted it passes over a light transmitting platen disposed above the light source and a selectively insertable transparency bearing a graphic design. An opening in the housing provides access to the portion of the paper passing over the transparency, platen and light source to permit repetitive tracing of the graphic design. Storage for additional transparencies and drawing materials is also provided in the housing.

BRIEF DESCRIPTION OF THE DRAWING

For a better understanding of the present invention reference may be had to the accompanying drawing in which:

FIG. 1 is a perspective view of an embodiment of the present invention;

FIG. 2 is a reduced scale front elevational view showing the top open;

FIG. 3 is an enlarged scale sectional view taken generally along the line 3—3 of FIG. 1;

FIG. 4 is a sectional view taken generally along the line 4—4 of FIG. 3;

FIG. 5 is a sectional view taken generally along the line 5-5 of FIG. 3; and

FIG. 6 is a sectional view taken generally along the line 6—6 of FIG. 3.

DETAILED DESCRIPTION OF THE PREFERRED EMBODIMENT

Referring now the drawing in which like parts and designated by like reference numerals throughout the several views, there is shown in FIG. 1 a portable, self-contained, light box drawing toy 10 having a housing 12 including a lower box-like portion 14. The box is formed with a generally rectangular, planar bottom 16 and an upstanding peripheral wall 18. At one end the peripheral wall has integrally molded, spaced apart, hinge leaves 20. Depending below the bottom wall 16 is a rearwardly open storage shelf or slot 22 that is also integrally formed as part of the lower box-like portion 14. On the underside of the bottom wall 16 adjacent each corner is a spacer foot 24.

Within the box-like portion 14 is a reflector/divider 26 attached to the bottom wall 16 by adhesives or other suitable fastening means. The central portion of the divider 26 is a, generally U-shaped in cross section, reflector 28. Mounted over the open half of the U-shaped reflector is a light transmitting platen 30 formed of any one of a number of conventional transparent or translucent materials. As is illustrated in FIG. 6, there is a short upstanding rib 32 along the back edge of the platen 30 which is integrally formed as part of a plastic platen. Screws 32 or other suitable fasteners including adhesives attach platen 30 to the divider 26. Extending through one of the sides of the reflector is a lamp socket 38 that is disposed so as to generally orient the bulb 40 centrally within the U-shaped reflector 28. A pair of batteries 42 are held in a clip 44 attached to the bottom wall 16 by suitable fasteners. Accessible through the peripheral wall 18 is an on/off switch 46 that is connected with the batteries 42 and light bulb 40 by conventional wiring (not shown).

Between the hinge leaf end of the portion 14 and the divider 26 are a pair of spaced apart trunnions 48 extending upwardly from the bottom wall 16. The trunnions may be either integrally formed with the portion 14 or attached by adhesives, heat staking or other suitable conventional fastening methods.

Housing 12 also includes an upper cover 50 which has a generally planar top piece 52. A skirt 54 depending from the top piece 52 overlaps portions of the peripheral wall 18 of the lower box-like portion. At one end, the peripheral wall 54 is provided with spaced apart hinge leaves 56 that mate with the hinge leaves 20 on the lower portion and each mating set of leaves is connected together by a hinge pin 58 permitting pivotal movement of the cover 50 with respect to the lower portion 14 as illustrated in FIG. 2.

Generally planar top piece 52 includes a generally semicylindrical enlarged section 60 near the end that has the hinge leaves. Facing toward the hinged end, the semicylindrical enlargement is provided with an elongated oblong opening 62. Approximately in the middle of the length of the cover, an opening 64 extends through the top piece 52.

Beyond the opening 64 toward the end away from the semicylindrical enlargement 60, is a generally vertically disposed slot 66, the upper edge of which is formed at a sharp angle to provide a cutting edge 68. As is best illustrated in FIG. 3, the portion 70 of the top 52 that lies beyond the slot 66 is depressed.

Journaled for rotation in the trunnions 48 is an axle 72 for a roll of paper 74. The diameter of the roll of paper is accommodated by the generally semicylindrical enlargement 60 on the cover. A strip 76 is extracted or dispensed from the rotatable roll of paper 74 over the light transmitting platen 30 and out of the slot 66.

Drawing toy 10 is provided with a set of transparencies 80, 82 and 84 each containing a different professional drawn design. The transparencies are sized to fit between the platen 30 and the strip of paper 76 by insertion through the back until the transparency abuts the rib 32. Transparencies that are not being used may be stored on the depending shelf 22. As is best illustrated in FIGS. 4, 5 and 6, additional, closeable storage space 88 is provided within the housing for drawing materials.

In use, a transparency is selected and placed atop the platen 30 and under a strip of paper 76. If, after a preceding use, the paper strip had been cut off too close to the knife edge 68, the paper may be advanced by grasping it through the opening 64 or by inserting a finger or thumb in the oblong opening 62 and rotating the roll 74. However, if the paper has somehow been retracted all the way back beyond the edge of the opening 64 onto the roll, or if the roll needs replacement, the cover 50 will have to be opened as illustrated in FIG. 2 for insertion of a new roll of paper.

Once the paper and the selected transparency are properly positioned, the switch 46 is turned on to energize the light 40 and a child may, using a variety of drawing materials, trace the graphic design of the transparency onto the strip of paper. Thereafter, the child may advance the strip of paper and repeat all or a portion of the design contained on the selected transparency or substitute provided transparencies to create an elongated design such as a row of houses, a train, a huge sandwich, or a long dragon.

While a particular embodiment of the present invention has been shown and described, changes and modifications will occur to those skilled in the art. It is intended in the appended claims to cover all such changes and modifications as fall within the true spirit and scope of the present invention.

What is claimed as new and desired to be secured by Letters Patent is:

1. A toy drawing machine comprising:
    a hollow, closed housing with elongated sides between one end and the other end;
    the closed housing including a lower portion and a hinged cover that pivots open for access to the hollow interior;
    a roll of paper mounted within the closed housing adjacent the one end for rotational dispensing;
    a light source within the housing
    a light transmitting platen carried by the housing above the light source;
    means permitting extension of a portion of the paper from the roll over the platen and out the other end of the closed housing without having to pivot open the cover;
    the cover including means permitting drawing access to the extended portion of the paper over the platen;
    a transparency bearing a graphic design; and
    the housing further including means for inserting the transparency in a direction transverse to an elongated side and positioning the transparency between the platen and the extended portion of the paper.

2. The drawing toy of claim 1 including storage means for a plurality of transparencies.

3. The drawing toy of claim 1 in which the means for inserting and positioning the transparency includes stop means.

4. The drawing toy of claim 1 in which the housing further includes storage means for drawing materials.

5. The drawing toy of claim 1 in which the housing further includes a depressed portion adjacent the access means and remote from the roll of paper facilitating extraction of the paper.

6. The drawing toy of claim 1 in which the means for insertion and positioning of the transparency includes an opening in the closed housing.

7. The drawing toy of claim 6 in which the means for inserting and positioning the transparency further includes an abutment opposite the opening.

* * * * *